US012695534B2

(12) United States Patent
Pateromichelakis et al.

(10) Patent No.: US 12,695,534 B2
(45) Date of Patent: Jul. 28, 2026

(54) MODEL BASED PREDICTIVE INTERFERENCE MANAGEMENT

(71) Applicant: Lenovo (Singapore) Pte. Ltd., New Tech Park (SG)

(72) Inventors: Emmanouil Pateromichelakis, Viersen (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 413 days.

(21) Appl. No.: 18/009,940

(22) PCT Filed: Jun. 10, 2020

(86) PCT No.: PCT/EP2020/066132
§ 371 (c)(1),
(2) Date: Dec. 12, 2022

(87) PCT Pub. No.: WO2021/249638
PCT Pub. Date: Dec. 16, 2021

(65) Prior Publication Data
US 2023/0246724 A1 Aug. 3, 2023

(51) Int. Cl.
*H04W 72/541* (2023.01)
*H04J 11/00* (2006.01)
*H04W 72/0453* (2023.01)

(52) U.S. Cl.
CPC ....... *H04J 11/005* (2013.01); *H04W 72/0453* (2013.01); *H04W 72/541* (2023.01)

(58) Field of Classification Search
CPC ..... H04L 41/22; H04L 41/0894; H04L 41/12;

H04L 41/145; H04W 24/02; H04W 72/541; H04W 24/04; H04W 24/10; H04W 72/0453; H04W 88/12; H04J 11/005

See application file for complete search history.

(56) References Cited

U.S. PATENT DOCUMENTS

| | | | |
|---|---|---|---|
| 10,039,016 B1 | 7/2018 | Larish et al. | |
| 10,200,884 B2 | 2/2019 | Tan et al. | |
| 2012/0207032 A1* | 8/2012 | Chen ..................... | H04W 16/14 |
| | | | 370/252 |

(Continued)

FOREIGN PATENT DOCUMENTS

| | | |
|---|---|---|
| JP | 2013026980 A | 2/2013 |
| WO | 2014081371 A1 | 5/2014 |
| WO | 2020068127 A1 | 4/2020 |

OTHER PUBLICATIONS

Feng, Mingjie; Mao, Shiwen; "Dealing with Limited Backhaul Capacity in Millimeter-Wave Systems: A Deep Reinforcement Learning Approach", Mar. 29, 2019, IEEE Communication Magazine (vol. 57, Issue: 3, 2019, pp. 50-55). (Year: 2019).*

(Continued)

*Primary Examiner* — Gary Mui
(74) *Attorney, Agent, or Firm* — Kunzler Needham Hilton

(57) ABSTRACT

Apparatuses, methods, and systems are disclosed for model based predictive interference management. One method includes receiving at least one monitoring report from a device. The method includes determining a monitoring event report based on a subscription and the at least one monitoring report. The method includes providing the providing the monitoring event report to an application.

20 Claims, 12 Drawing Sheets

(56)                  References Cited

U.S. PATENT DOCUMENTS

| | | |
|---|---|---|
| 2013/0031036 A1 | 1/2013 | Kojima |
| 2014/0179335 A1 | 6/2014 | Pikhletsky et al. |
| 2017/0064031 A1 | 3/2017 | Sunay |
| 2019/0158131 A1 | 5/2019 | Tsui et al. |
| 2019/0357057 A1 | 11/2019 | Cirkic et al. |
| 2020/0084777 A1 | 3/2020 | Ergen |
| 2021/0021355 A1 | 1/2021 | Hwang et al. |
| 2021/0235323 A1* | 7/2021 | Parekh .................. H04W 28/16 |
| 2021/0258866 A1 | 8/2021 | Chou |
| 2021/0258988 A1 | 8/2021 | Balakrishnan et al. |
| 2022/0116799 A1 | 4/2022 | Wang et al. |
| 2022/0295309 A1 | 9/2022 | Akhtar et al. |
| 2023/0072769 A1 | 3/2023 | Yeh et al. |
| 2023/0209586 A1 | 6/2023 | Challita et al. |

OTHER PUBLICATIONS

PCT/EP2020/066129, "Notification of Transmittal of the International Search Report and the Written Opinion of the International Searching Authority, or the Declaration", International Searching Authority, Mar. 26, 2021, pp. 1-16.

PCT/EP2020/066132, "Notification of Transmittal of the International Search Report and the Written Opinion of the International Searching Authority, or the Declaration", International Searching Authority, Feb. 26, 2021, pp. 1-16.

Niknam et al., "Intelligent O-RAN for Beyond 5G and 6G Wireless Networks", arXiv:2005.08374v1 [eess.SP], May 17, 2020, pp. 1-7.

O-RAN, "O-RAN Working Group 2 AI/ML workflow description and requirements", O-RAN.WG2.A1 ML-v01.01, 2019, pp. 1-47.

O-RAN, "O-RAN Working Group 3 Near-Real-time RAN Intelligent Controller Architecture & E2 General Aspects and Principle", O RAN-WGI E2GAP-v01.00.00, 2020, pp. 1-26.

O-RAN, "O-RAN Working Group 1 Use Cases Detailed Specification", O-RAN.WG 1. Use-Cases-Detailed-Specification-v02.00, 2020, pp. 1-46.

Madi et al., "On Multi-cell Packet Scheduling of LTE-A Cellular Networks: A Survey of Concepts Related Challenges and Solutions", Journal of Applied Sciences 14 (20): 2422-2438, 2014, pp. 1-18.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.

U.S. Appl. No. 18/009,927, "Office Action Summary", United States Patent and Trademark Office, Apr. 2, 2025, pp. 1-21.

U.S. Appl. No. 18/009,927, "Office Action Summary", United States Patent and Trademark Office, Aug. 15, 2025, 2025, pp. 1-17.

* cited by examiner

200

300

400

404

418

422 426

424 428

420

412

408

416

402

414

432

434 436

438 430

440

410

406

700

| Non-RT RIC 702 | IM xAPP 704 | Conflict Mitigation 706 | Subscription Management 708 | Middleware 710 | NR 712 |

714

716        718

720

722

724

726

728

730

732

734

736

738

740

800

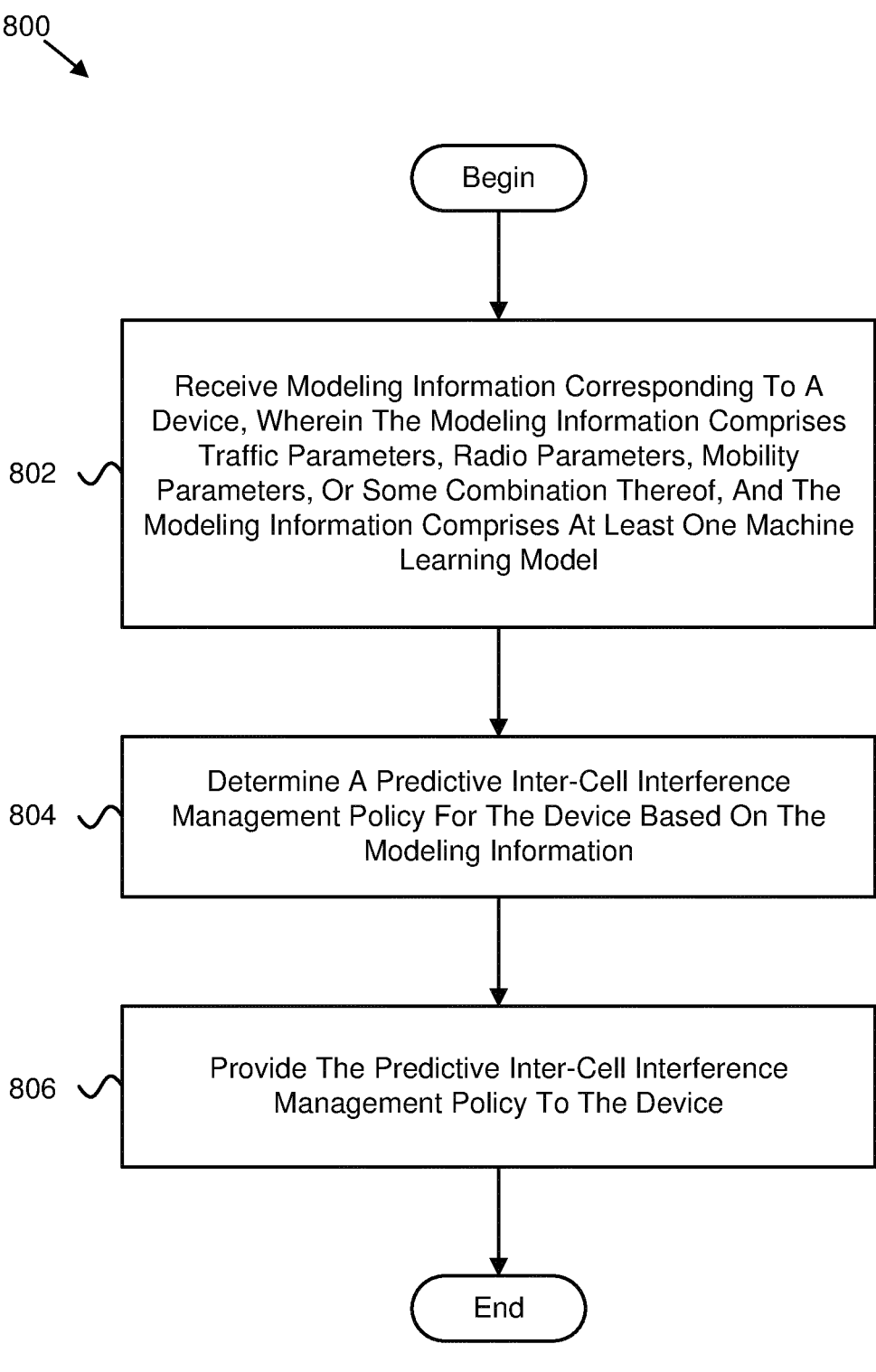

Begin

802    Receive Modeling Information Corresponding To A Device, Wherein The Modeling Information Comprises Traffic Parameters, Radio Parameters, Mobility Parameters, Or Some Combination Thereof, And The Modeling Information Comprises At Least One Machine Learning Model 804    Determine A Predictive Inter-Cell Interference Management Policy For The Device Based On The Modeling Information 806    Provide The Predictive Inter-Cell Interference Management Policy To The Device End

Begin

902 — Receive At Least One Monitoring Report From A Device

904 — Determine A Monitoring Event Report Based On A Subscription And The At Least One Monitoring Report 906 — Provide The Monitoring Event Report To An Application End

1000

1200

Begin

1202 — Receive A Predictive Resource Management Policy From At Least One Application 1204 — Determine At Least One Radio Parameter Corresponding To The Predictive Resource Management Policy 1206 — Transmit The At Least One Radio Parameter Based On The Predictive Resource Management Policy To A Device End

MODEL BASED PREDICTIVE INTERFERENCE MANAGEMENT

FIELD

The subject matter disclosed herein relates generally to wireless communications and more particularly relates to model based predictive interference management.

BACKGROUND

The following abbreviations are herewith defined, at least some of which are referred to within the following description: Third Generation Partnership Project ("3GPP"), $5^{th}$ Generation ("5G"), 5G System ("5GS"), QoS for NR V2X Communication ("5QI/PQI"), Authentication, Authorization, and Accounting ("AAA"), Positive-Acknowledgment ("ACK"), Artificial Intelligence ("AI"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Programming Interface ("API), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Backhaul ("BH"), Binary Phase Shift Keying ("BPSK"), Base Station ("BS"), Buffer Status Report ("BSR"), Bandwidth ("BW"), Bandwidth Part ("BWP"), Cloud-Resource Access Network ("C-RAN"), Cell RNTI ("C-RNTI"), Carrier Aggregation ("CA"), Channel Access Priority Class ("CAPC"), Coordinated Beamforming ("CB"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Connection Mobility Control ("CMC"), Coordinated Multipoint ("CoMP"), Channel Occupancy Time ("COT"), Cyclic Prefix ("CP"), Channel Quality Indicator ("CQI"), Cyclical Redundancy Check ("CRC"), Coordinated Scheduling ("CS"), Channel State Information ("CSI"), Channel State Information-Reference Signal ("CSI-RS"), Common Search Space ("CSS"), Control Resource Set ("CORESET"), Central Unit ("CU"), Device-to-Device ("D2D"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Dynamic Resource Allocation ("DRA"), Data Radio Bearer ("DRB"), Discontinuous Reception ("DRX"), Dedicated Short-Range Communications ("DSRC"), Distributed Unit ("DU"), Downlink Pilot Time Slot ("DwPTS"), Evolved Universal Terrestrial Access Network ("E-UTRAN"), E2 Termination ("E2T"), Enhanced Clear Channel Assessment ("eCCA"), Enhanced Mobile Broadband ("eMBB"), Evolved Node B ("eNB"), Extensible Authentication Protocol ("EAP"), Enhanced Inter-cell Interference Coordination ("eICIC"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Fractional Frequency Reuse ("FFR"), Further Enhanced Inter-cell Interference Coordination ("FeICIC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Heterogeneous Networks ("HetNets"), High Interference Indication ("HII"), Home Location Register ("HLR"), Handover ("HO"), Home PLMN ("HPLMN"), Home Subscriber Server ("HSS"), Hash Expected Response ("HXRES"), Inter-cell Interference Coordination ("ICIC"), Identity or Identifier ("ID"), Information Element ("IE"), Industrial Internet of Things ("IIoT"), Interference Management ("IM"), International Mobile Equipment Identity ("IMEI"), International Mobile Subscriber Identity ("IMSI"), International Mobile Telecommunications ("IMT"), Internet-of-Things ("IoT"), Joint Reception ("JR"), Joint Transmission ("JT"), Key Management Function ("KMF"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Balancing ("LB"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), LTE Advanced ("LTE-A"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Machine Learning ("ML"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), O-RAN CU Control Plane ("O-CU-CP"), O-RAN CU User Plane ("O-CU-CP"), O-RAN DU ("O-DU"), Orthogonal Frequency Division Multiplexing ("OFDM"), Overload Indication ("OI"), Open-Loop ("OL"), Open RAN ("O-RAN"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Experience ("QoE"), Quality of Service ("QoS"), Quadrature Phase Shift Keying ("QPSK"), Registration Area ("RA"), RA RNTI ("RA-RNTI"), Radio Access Network ("RAN"), Radio Access Network—Control Plane ("RAN CP"), Random ("RAND"), Radio Access Network—User Plane ("RAN UP"), Radio Access Technology ("RAT"), Serving RAT ("RAT-1") (serving with respect to Uu), Other RAT ("RAT-2") (non-serving with respect to Uu), Radio Admission Control ("RAC"), Random Access Procedure ("RACH"), Random Access Preamble Identifier ("RAPID"), Random Access Response ("RAR"), Resource Block ("RB"), Resource Block Assignment ("RBA"), Radio Bearer Control ("RBC"), Resource Element Group ("REG"), Radio Access Network Intelligent Controller ("RIC"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Relative Narrowband TX Power ("RNTP"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Real Time ("RT"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Software Defined Networks ("SDN"), Service Data Unit ("SDU"), Security Anchor Function ("SEAF"), Sidelink Feedback Content Information ("SFCI"), Soft Frequency Reuse ("SFR"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Self Organized Networks ("SON"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-

SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Ultra-Dense Network ("UDN"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, interference may occur.

BRIEF SUMMARY

Methods for model based predictive interference management are disclosed. Apparatuses and systems also perform the functions of the methods. One embodiment of a method includes receiving modeling information corresponding to a device, wherein the modeling information comprises traffic parameters, radio parameters, mobility parameters, or some combination thereof, and the modeling information comprises at least one machine learning model. In some embodiments, the method includes determining a predictive inter-cell interference management policy for the device based on the modeling information. In certain embodiments, the method includes providing the predictive inter-cell interference management policy to the device.

One apparatus for model based predictive interference management includes a receiver that receives modeling information corresponding to a device, wherein the modeling information comprises traffic parameters, radio parameters, mobility parameters, or some combination thereof, and the modeling information comprises at least one machine learning model. In various embodiments, the apparatus includes a processor that: determines a predictive inter-cell interference management policy for the device based on the modeling information; and provides the predictive inter-cell interference management policy to the device.

Another embodiment of a method for model based predictive interference management includes receiving at least one monitoring report from a device. In some embodiments, the method includes determining a monitoring event report based on a subscription and the at least one monitoring report. In certain embodiments, the method includes providing the monitoring event report to an application.

Another apparatus for model based predictive interference management includes a receiver that receives at least one monitoring report from a device. In various embodiments, the apparatus includes a processor that: determines a monitoring event report based on a subscription and the at least one monitoring report; and provides the monitoring event report to an application.

Yet another embodiment of a method for model based predictive interference management includes transmitting at least one monitoring report. In some embodiments, the method includes receiving information corresponding to a predictive inter-cell interference management policy in response to transmitting the at least one monitoring report.

Yet another apparatus for model based predictive interference management includes a transmitter that transmits at least one monitoring report. In certain embodiments, the apparatus includes a receiver that receives information corresponding to a predictive inter-cell interference management policy in response to transmitting the at least one monitoring report.

Another embodiment of a method for model based predictive interference management includes transmitting an initial configuration. In various embodiments, the method includes receiving a request for modeling information in response to transmitting the initial configuration. In some embodiments, the method includes transmitting the modeling information in response to receiving the request, wherein the modeling information comprises traffic parameters, radio parameters, mobility parameters, or some combination thereof, and the modeling information comprises at least one machine learning model.

Another apparatus for model based predictive interference management includes a transmitter that transmits an initial configuration. In certain embodiments, the apparatus includes a receiver that receives a request for modeling information in response to transmitting the initial configuration; wherein the transmitter transmits the modeling information in response to receiving the request, wherein the modeling information comprises traffic parameters, radio parameters, mobility parameters, or some combination thereof, and the modeling information comprises at least one machine learning model.

A further embodiment of a method for model based predictive interference management includes receiving a predictive resource management policy from at least one application. In various embodiments, the method includes determining at least one radio parameter corresponding to the predictive resource management policy. In some embodiments, the method includes transmitting the at least one radio parameter based on the predictive resource management policy to a device.

A further apparatus for model based predictive interference management includes a receiver that receives a predictive resource management policy from at least one application. In certain embodiments, the apparatus includes a processor that determines at least one radio parameter corresponding to the predictive resource management policy. In various embodiments, the apparatus includes a transmitter that transmits the at least one radio parameter based on the predictive resource management policy to a device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a method for model based predictive interference management;

DETAILED DESCRIPTION

Figure 1:
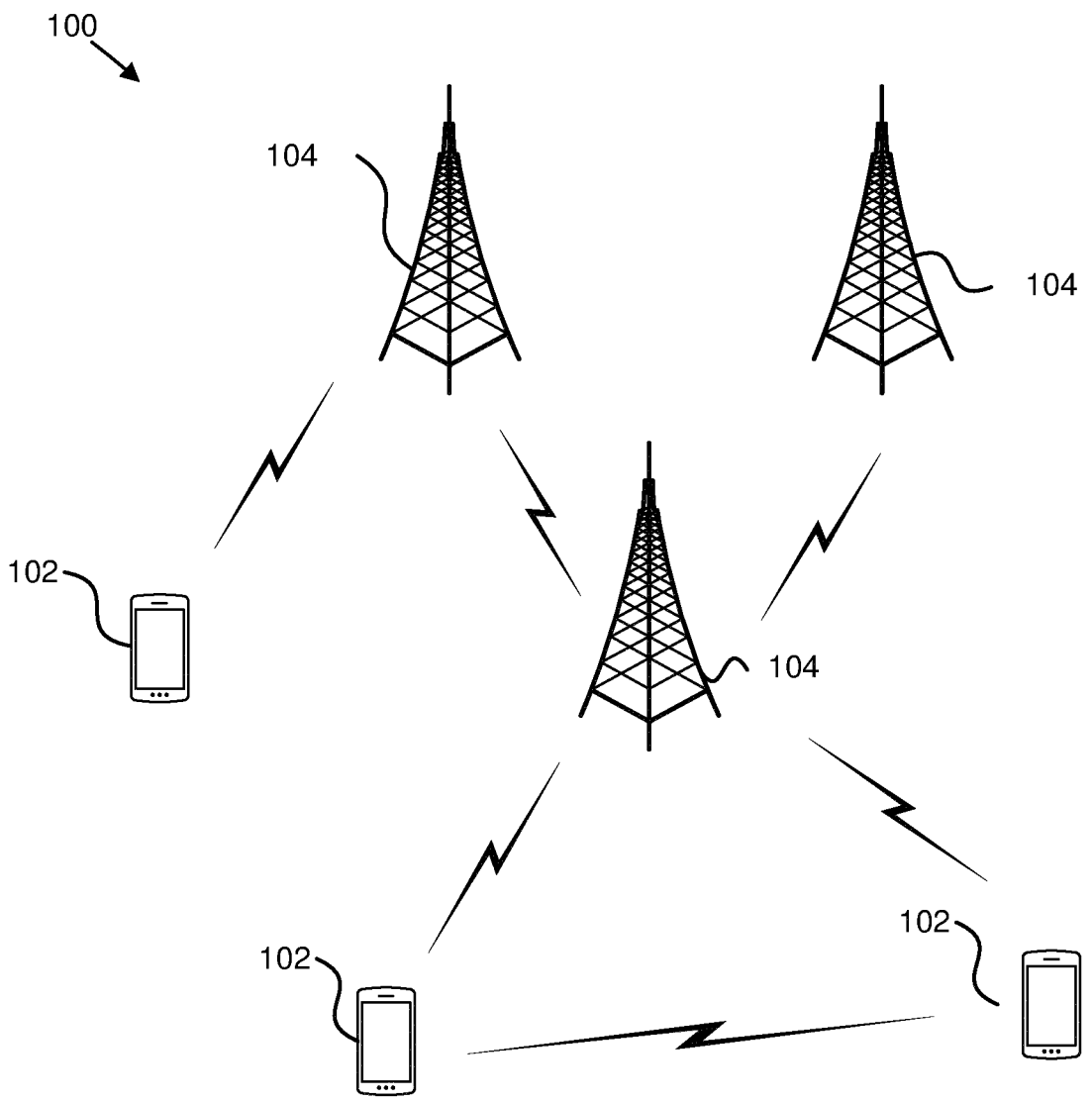
FIG. 1 is a schematic block diagram illustrating one embodiment of a wireless communication system for model based predictive interference management.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for model based predictive interference management. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, a middleware device, a middleware entity, a middleware function, NR, a subscription management, a subscription management function, a conflict mitigation, a conflict mitigation function, an IM xAPP, a near-RT RIC, a non-RT RIC, a service and/or management plane, a near-RT RIC framework function, or by any other terminology used in the art and/or used herein. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive modeling information corresponding to a device, wherein the modeling information comprises traffic parameters, radio parameters, mobility parameters, or some combination thereof, and the modeling information comprises at least one machine learning model. In some embodiments, the network unit 104 may determine a predictive inter-cell interference management policy for the device based on the modeling information. In certain embodiments, the network unit 104 may provide the predictive inter-cell interference management policy to the device. Accordingly, the network unit 104 may be used for model based predictive interference management.

In some embodiments, a network unit 104 may receive at least one monitoring report from a device. In various embodiments, the network unit 104 may determine a monitoring event report based on a subscription and the at least one monitoring report. In certain embodiments, the network unit 104 may provide the monitoring event report to an application. Accordingly, the network unit 104 may be used for model based predictive interference management.

In certain embodiments, a network unit 104 may transmit at least one monitoring report. In various embodiments, the network unit 104 may receive information corresponding to a predictive inter-cell interference management policy in response to transmitting the at least one monitoring report. Accordingly, the network unit 104 may be used for model based predictive interference management.

In various embodiments, a network unit 104 may transmit an initial configuration. In some embodiments, the network unit 104 may receive a request for modeling information in response to transmitting the initial configuration. In certain embodiments, the network unit 104 may transmit the modeling information in response to receiving the request, wherein the modeling information comprises traffic parameters, radio parameters, mobility parameters, or some combination thereof, and the modeling information comprises at least one machine learning model. Accordingly, the network unit 104 may be used for model based predictive interference management.

In some embodiments, a network unit 104 may receiving a predictive resource management policy from at least one application. In various embodiments, the network unit 104 may determine at least one radio parameter corresponding to the predictive resource management policy. In some embodiments, the network unit 104 may transmit the at least one radio parameter based on the predictive resource management policy to a device. Accordingly, the network unit 104 may be used for model based predictive interference management.

Figure 2:
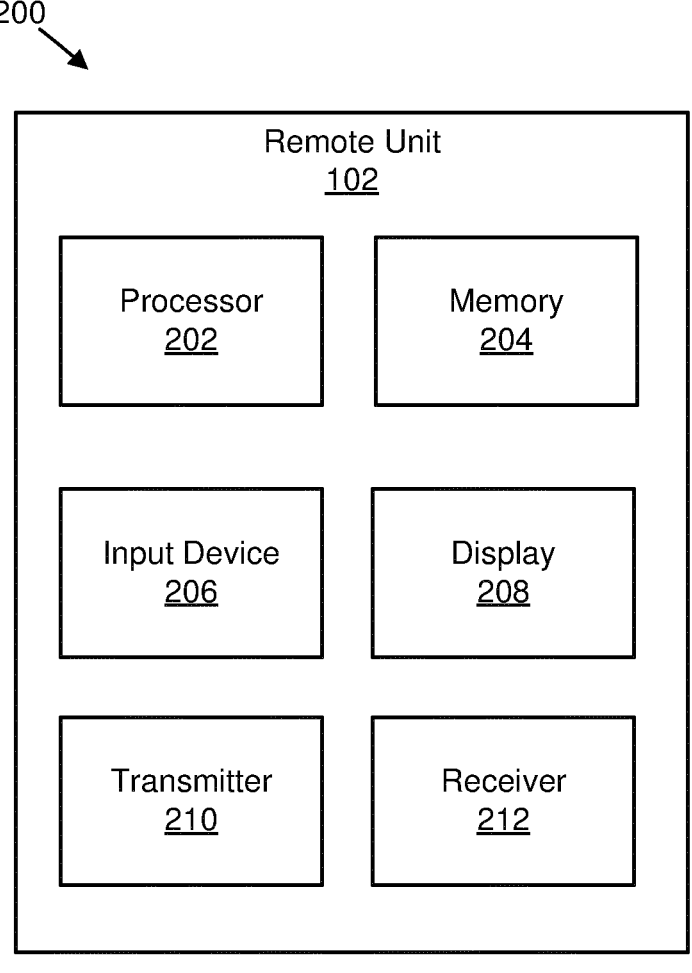
FIG. 2 is a schematic block diagram illustrating one embodiment of an apparatus that may be used for model based predictive interference management.

FIG. 2 depicts one embodiment of an apparatus 200 that may be used for model based predictive interference management. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may be used for transmitting information described herein and/or the receiver 212 may be used for receiving information described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver. In some embodiments, the transmitter 210 may refer to sending or providing data via a software communication (or transmission) of data. In various embodiments, the receiver 212 may refer to receiving data via a software communication or software receiver.

Figure 3:
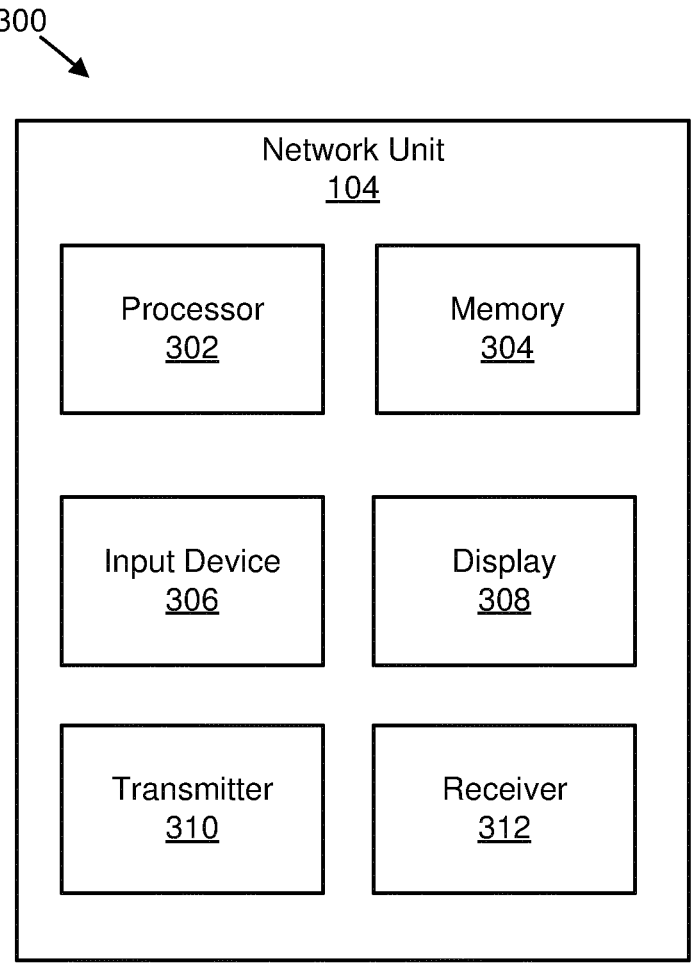
FIG. 3 is a schematic block diagram illustrating one embodiment of an apparatus that may be used for model based predictive interference management.

FIG. 3 depicts one embodiment of an apparatus 300 that may be used for model based predictive interference management. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive modeling information corresponding to a device, wherein the modeling information comprises traffic parameters, radio parameters, mobility parameters, or some combination thereof, and the modeling information comprises at least one machine learning model. In various embodiments, the processor 302 may: determine a predictive inter-cell interference management policy for the device based on the modeling information; and provide the predictive inter-cell interference management policy to the device.

In some embodiments, the receiver 312 may receive at least one monitoring report from a device. In various embodiments, the processor 302 may: determine a monitoring event report based on a subscription and the at least one monitoring report; and provide the monitoring event report to an application.

In one embodiment, the transmitter 310 may transmit at least one monitoring report. In certain embodiments, the receiver 312 may receive information corresponding to a predictive inter-cell interference management policy in response to transmitting the at least one monitoring report.

In various embodiments, the transmitter 310 may transmit an initial configuration. In some embodiments, the receiver 312 may receive a request for modeling information in response to transmitting the initial configuration. In certain embodiments, the transmitter 310 may transmit the modeling information in response to receiving the request, wherein the modeling information comprises traffic parameters, radio parameters, mobility parameters, or some combination thereof, and the modeling information comprises at least one machine learning model.

In certain embodiments, the receiver 312 may receive a predictive resource management policy from at least one application. In some embodiments, the processor 302 may determine at least one radio parameter corresponding to the predictive resource management policy. In various embodiments, the transmitter 310 may transmit the at least one radio parameter based on the predictive resource management policy to a device.

Certain embodiments described herein may be used to proactively minimize the impact of inter-cell interference in dense virtualized small cell co-channel deployments.

In some embodiments, such as in 5G RANs, UDNs may result in interference challenges. In various embodiments, various factors may affect the way interference management is handled: a wide use of beam-forming; UL and/or DL cross-interference for TDD; novel modes of communication (e.g., self-backhauling, cellular assisted D2D); and stringent application requirements (e.g., for latency-critical applications).

In certain embodiments, separation of RAN CP (e.g., RRM) functions and UP for an SDN may be used, such as in a 5G architecture. In such embodiments, interference management RRM functionality may be one key enabler for such separation to improve flexibility and agility of a network. However, there may be challenges that make a full separation complex (e.g., tight coupling of CP and UP in the RAN). For example, real-time scheduling (or fast RRM) functionalities may use per TTI scheduling, while interference management (e.g., which may be located at an edge cloud platform) applies in near-real time (e.g., 10-100 ms). In this example, the real-time scheduling decisions may be provided to an IM function to adapt the policies. In some embodiments, such as in virtualized cluster RAN systems, it may be challenging to facilitate up-to-date IM decisions because of timing and/or backhaul requirements.

In various embodiments, data analytics (e.g., diagnostic and/or prescriptive analytics) may be used to enhance the performance of interference mitigation techniques and allow for taking decisions at a semi-centralized entity without using real-time feedback from involved RAN nodes. In such embodiments, selection of UL power control parameters (e.g., fractional versus full-compensation power control) and/or time-domain interference coordination for an optimal number of blank sub-frames may be performed. Predictive analytics may support decisions for the configuration of initial parameter settings (e.g., considering a probable load increase due to group mobility). Accordingly, the use of data analytics may improve resource utilization efficiency and/or reduce a need for frequent parameter adjustments.

Described herein may be various embodiments used to minimize inter-cell interference in clustered virtualized RAN deployments while keeping a signaling load and/or complexity low.

In some embodiments, RRM algorithms for cellular networks may be used to facilitate efficient use of available radio resources and to provide mechanisms that enable E-UTRAN and/or 5GS to meet radio resource related requirements. In such embodiments, RRM may provide means to manage (e.g., assign, re-assign, and/or release) radio resources for single and/or multi-cell systems.

In certain embodiments, inter-cell interference management may be an RRM functionality that may reside at a BS or in a cloud platform for a cluster of access nodes (e.g., C-RAN). Interference management may take different forms, such as: 1) interference cancellation and/or randomization (e.g., related to physical layer enhancements to cancel interference); 2) interference avoidance and/or coordination (e.g., ICIC, eICIC, and/or FeICIC); and/or 3) interference cooperation (e.g., coordinated multi-point TX and/or RX).

As may be appreciated, there may be different implementations of RRM algorithms if virtualization of radio resource management enables RRM functions to be placed in different entities, such as a centralized RRM, a distributed RRM, and a semi-centralized RRM.

In a centralized RRM, RRM functions operate together in an entity for multiple access nodes in a group. This may provide fast and simple interaction between RRM functions, but on the other hand in HetNets, ideal backhaul may be used for some fast RRM functions (e.g., CoMP, DRA). Moreover, signaling overhead may be very high in ultra-dense environments. Furthermore, for 5G systems, various embodiments may use a controller for clusters of HetNets using cloud-based resource pooling and management (e.g., cloud-RAN, C-RAN). As may be appreciated, resource pooling and centralized management of resources may provide high gain in terms of capacity. Nevertheless, this may use ideal backhaul and/or fronthaul and may be challenging for DRA in certain environments in which there may be interference from other C-RAN clusters.

In a distributed RRM, such as used in 3GPP LTE and/or LTE-A, RRM functions reside at an eNB. The main RRM functions are about DRA, ICIC, CMC, RAC, RBC, energy efficiency, and LB. In an LTE RRM structure, there may be interactions between RRM functions. In one example, there may be a cell on and/or off function that might use input from resource restrictions due to interference management, and may have output that uses handovers that may affect CMC and LB. Because the main functions reside at the eNB, there may be no additional signaling specified in 3GPP for RRM interactions.

In a semi-centralized RRM, there may be a focus on centralized interference management and load balancing and distributed fast RRM functionalities. One challenge for semi-centralized RRM may be that interactions may use additional signaling and complexity in various RAN nodes.

O-RAN relates to the virtualization of access domains and the virtualization of control functionalities (e.g., RRC and/or RRM) to an RIC that may be co-located with a gNB or may be deployed for a cluster of gNBs. As may be appreciated, RRM and/or RRC functionalities may be either flexibly located either at a CU and/or DU or at dedicated RIC controllers (e.g., near-RT RIC and non-RT RIC).

Figure 4:
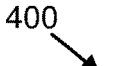
FIG. 4 is a diagram illustrating one embodiment of a system for interference management.

FIG. 4 is a diagram illustrating one embodiment of a system 400 for interference management. The system 400 may operate with an O-RAN and/or near RT-RIC architecture.

As used herein, non-RT RIC may refer to a logical function that enables non-real-time control and optimization of RAN elements and resources, AI and/or ML workflow including model training and updates, and policy-based guidance of applications and/or features in a near-RT RIC.

Moreover, as used herein, a near-RT RIC and framework functions may refer to a logical function that enables near-real-time control and optimization of RAN elements and resources via fine-grained (e.g., UE basis, cell basis) data collection and actions over an E2 interface. Near-RT RIC may include near-RT RIC basic and/or framework functions that may include subscription management, conflict mitigation, and E2T.

Furthermore, as used herein, a conflict management and/or a mitigation function may be a function that is part of a near RT RIC and may be used to avoid conflicting control messages from different xAPPs. Based on the output of conflict mitigation, the E2T may generate only one reasonable control message on an E2 interface.

In addition, as used herein, a subscription management function may refer to functionality in which xAPPs subscribe for controlling E2 nodes. The subscription management function may merge identical subscriptions from different xAPPs. Based on the output of the subscription management function, the E2T may generate only one message to transmit to E2 nodes.

Moreover, as used herein, an xApp may refer to an application designed to run on a near-RT RIC. The application may include one or more microservices and, at a point of on-boarding, may identify which data it consumes and which data it provides. The application may be independent from the near-RT RIC and may be provided by a third party. The E2 may enable a direct association between the xApp and RAN functionality.

Furthermore, as used herein, A1 (or O1) may refer to an interface between a non-RT RIC and a near-RT RIC to enable policy-driven guidance of near-RT RIC applications and/or functions, and may support AI and/or ML workflow.

In addition, as used herein, E2 may refer to an interface connecting a near-RT RIC and NR.

Moreover, as used herein, an E2 node may refer to a logical node terminating an E2 interface (e.g., NR nodes like O-CU-CP, O-CU-UP, O-DU, or virtualized eNB).

Furthermore, as used herein, open API may refer to a definition within near-RT RIC and/or may be an interface between framework functions and xAPPs.

The system 400 of FIG. 4 includes a service and/or management plane 402, a near-RT RIC 404, and an NR system 406. The service and/or management plane 402 communicates with the near-RT RIC 404 via an A1 interface 408. Moreover, the near-RT RIC 404 communicates with the NR system 406 via an E2 interface 410. The service and/or management plane 402 includes a non-RT RIC 412 and a configuration 414. The configuration 414 may include policy, inventory, and/or design information.

The near-RT RIC 404 includes an A1T 416 (or O1T) that may be a logical node terminating the A1 interface 408. The near-RT RIC 404 also includes multiple xAPPs 418 that communicate with the A1T 416 via a first open API 420. The xAPPs 418 include a first xAPP 422, a second xAPP 424, a third xAPP 426, and a fourth xAPP 428. The near-RT RIC 404 also includes near-RT RIC framework functions 430. The near-RT RIC framework functions 430 communicate with the xAPPs 418 via a second open API 432. Further, the near-RT RIC framework functions 430 include a subscription management function 434, a conflict mitigation function 436, and a database 438. The near-RT RIC 404 further includes an E2T 440 that may be a logical node terminating the E2 interface 410 and may enable communication between components of the near-RT RIC 404 and the NR 406.

Described herein are various embodiments for configuring inter-cell interference aware resource allocation strategies on behalf and/or on top of resource allocation strategies for a set of RAN nodes with the support of trained traffic and mobility AI and/or ML models. One embodiment is described in relation to FIG. 5.

Figure 5:
FIG. 5 is a diagram illustrating another embodiment of a system for interference management.

FIG. 5 is a diagram illustrating another embodiment of a system 500 for interference management. The system 500 includes a service and/or management plane 502, a near-RT RIC 504, and an NR system 506. The service and/or management plane 502 communicates with the near-RT RIC 504 via an A1 interface. Moreover, the near-RT RIC 504 communicates with the NR system 506 via an E2 interface. The service and/or management plane 502 includes a non-RT RIC 508 and a configuration 510. The configuration 510 may include policy, inventory, and/or design information.

The near-RT RIC 504 includes an A1T 512 (or O1T) that may be a logical node terminating the A1 interface. The near-RT RIC 504 also includes multiple xAPPs 514 that communicate with the A1T 512 via an open API. The xAPPs 514 include a first xAPP 516, a second xAPP 518 (e.g., IM xAPP), a third xAPP 520, and a fourth xAPP 522. The near-RT RIC 504 also includes near-RT RIC framework functions 524. The near-RT RIC framework functions 524 communicate with the xAPPs 514 via an open API. Further, the near-RT RIC framework functions 524 include a subscription management function 526, a conflict mitigation function 528, and a database 530. The near-RT RIC 504 further includes an E2T 532 that may be a logical node terminating the E2 interface and may enable communication between components of the near-RT RIC 504 and the NR 506. The system 500 also may include a middleware entity 534 to facilitate communications between the NR 506 and the near-RT RIC 504.

In a first communication 536 transmitted from the service and/or management plane 502 to the second xAPP 518, the second xAPP 518 initially receives IM configuration policies (e.g., initial configuration of policies) from the service and/or management plane 502 including: a list of available IM policies (e.g., ICIC, eICIC, CoMP 1, CoMP 2), thresholds and/or criteria for access and BH metrics which will support the selection and/or update of an IM policy, preferences, whether a policy can be enforced by the second xAPP 518, a recommendation, a time of coverage, and/or an area of coverage. The IM configuration policies may be vertical specific (e.g., V2X, IIoT) or common configurations for all verticals using RAN resources. This IM configuration policies may provide required interactions among xAPPs for intra-vertical and cross-vertical cases if controlling the same RAN nodes.

In a second communication 538 transmitted between the subscription management function 526 and the second xAPP 518, in response to receiving the IM configuration policies, the second xAPP 518 subscribes to receives UE monitoring events, RAN monitoring events, and/or measurements for a set of cells that are indicated in the first communication 536.

In a third communication 540 transmitted from the NR 506 to the second xAPP 518, the second xAPP 518 receives a trigger event indicating that a UE performance metric and/or a RAN performance metric has changed (e.g., resource overload, QoS downgrade) based on the subscription created in the second communication 538. This trigger event may be either provided by the NR 506 or in-directly by the middleware entity 534 based on real time radio measurements.

In a fourth communication 542 transmitted between the service and/or management plane 502 and the second xAPP 518, in response to receiving the trigger event, the second xAPP 518 requests and receives trained AI models for traffic prediction and/or mobility prediction for each cell or for one or more UEs within a set of cells indicated at the trigger event. This traffic prediction and/or mobility prediction may include an expected performance distribution of RAN or selected UEs in a pre-defined time window (e.g., 10 ms to 1 s).

The second xAPP 518 determines the IM policy (e.g., to be enforced or to be used as recommendation) for the set of cells as indicated by the trigger event. The criteria for selecting a particular IM policy are prediction outputs, and it may be determined whether expected metrics are within the thresholds as set in the first communication 536. A particular IM policy may be a policy that may apply for a given time window in the future (e.g., for the next 1 s) based on a prediction output.

In a fifth communication 544 transmitted between the conflict mitigation function 528 and the second xAPP 518, the second xAPP 518 may validate and/or check whether the IM policy is feasible with the support of a common control function that is used to authorize the IM policy request.

In a sixth communication 546 transmitted from the second xAPP 518 to the NR 506, the second xAPP 518 transmits the IM policy to respective RAN nodes of the NR 506 directly or via the middleware entity 534. The use of the middleware entity 534 may relax the constraints for dynamic IM policies (e.g., CoMP) if real-time radio parameters are needed by translating an IM policy to exact radio parameters (e.g., RB muting). The middleware entity 534 may be part of the near-RT RIC 504 or may be deployed as an agent collocated with a CU and/or a gNB.

Figure 6:
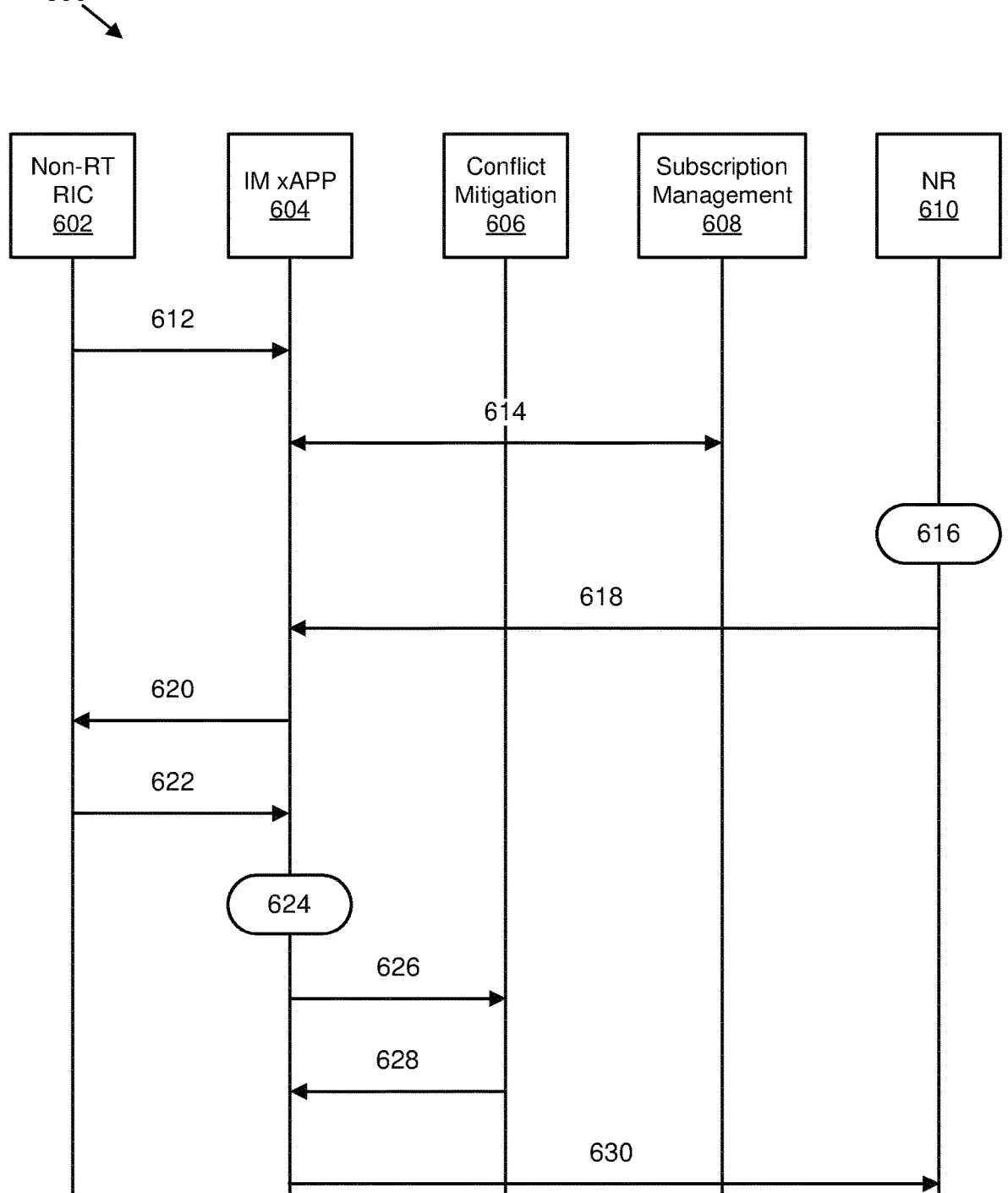
FIG. 6 is a diagram illustrating one embodiment of communications for interference management.

FIG. 6 is a diagram illustrating one embodiment of communications 600 for interference management. In this embodiment, an implementation targeting the O-RAN architecture is provided. In this architecture, an external application takes the form of an IM xAPP. The communications 600 include communications between a non-RT RIC 602 (e.g., a service and/or management plane, received by a near-RT RIC at an A1 termination), an IM xAPP 604 (e.g., external application), a conflict mitigation 606 (e.g., conflict mitigation function, may be at a near-RT RIC), a subscription management 608 (e.g., subscription management function, may be at a near-RT RIC), and an NR 610 (e.g., E2T, E2 node, CU, DU, RAN nodes). The communications 600 described herein may each include one or more messages.

In a first communication 612 transmitted from the non-RT RIC 602 to the IM xAPP 604, the IM xAPP 604 may receive an interference management policy message (e.g., from a non-RT RIC via A1T and via an open API between A1T and the IM xAPP 604). The interface management policy message may include: a cell ID; a network slice ID; a service type, an application type and/or an application profile (e.g., these may be related to verticals); a policy ID list (e.g., a policy 1: ICIC scheme 1 (e.g., FFR); a policy 2: ICIC scheme 2 (e.g., SFR); a policy 3: eICIC scheme; a policy 4: CoMP scheme 1 (e.g., CS,CB); a policy 5: CoMP scheme 2 (e.g., coherent JT, coherent JR); a policy 6: CoMP scheme 2 (e.g., non-coherent JT, non-coherent JR)); thresholds per policy (e.g., an O-RAN cell computational load; an O-CU load; an O-DU load; a RAN allowable delay; backhaul requirements per policy; a UE density minimum and/or maximum; a radio resource load); an indication of what an interference management preference contains (e.g., a cell ID list; resource pool IDs; a preference of policy for a list of cells (e.g., shall, prefer, avoid, forbid); a priority of policy for the list of cells (e.g., shall, prefer, avoid, forbid)); an enforcement flag (e.g., to enforce a policy or not); a time validity; an area of coverage; per vertical parameters (e.g., priorities among xAPPs within the same verticals, spectrum considerations, spectrum restrictions, isolation level, cluster of dedicated per vertical small cells under near-RT RIC); and/or cross-vertical parameters (e.g., priorities among xAPPs among verticals, spectrum considerations, spectrum restrictions, isolation level, cluster of common (for all verticals) small cells under near-RT RIC.

In a second communication 614 transmitted between the IM xAPP 604 and the subscription management 608, the IM xAPP 604 subscribes to the subscription management 608 of the near-RT RIC to receive RAN monitoring events, UE monitoring events, and/or measurements (e.g., RAN and/or UE) periodically. The subscription management 608 provides a request to RAN nodes respectively (e.g., this can be a merged request from more than one similar xAPP). This events monitored and/or measurements may include: radio resource utilization (e.g., DL and/or UL total PRB usage and/or distribution of usage, DL and/or UL PRB used for data traffic); DRB related measurements (e.g., number of DRBs successfully setup, in-session activity time for DRB); CQI related measurements (e.g., wideband CQI distribution); MCS related Measurements; QoS retainability; KPI monitoring; RAN UE throughout KPI monitoring; average and distribution of delay DL and/or UL air-interface; NG-RAN handover success rate monitoring; number of requested handover resource allocations; and/or number of successful handover resource allocations.

The NR 610 detects 616 a RAN or UE monitoring event.

In a third communication 618 transmitted from the NR 610 to the IM xAPP 604, the RAN or UE monitoring event is received by the IM xAPP 604 based on the monitoring subscription subscribed to in the second communication 614 (e.g., radio resource load for cell 1>X %). This event may be provided direct from the E2 node or in-directly via E2T and/or other framework of a near-RT RIC function. The information indicating the RAN or UE monitoring event may include: a cell ID; UE IDs; a network slice ID; a resource ID; a resource pool ID; a UE QoE downgrade indication; a QoS downgrade indication; a high resource load indication; a high RAN delay indication; a low backhaul resource availability indication; a QoS fluctuation indication; and/or a radio link failure indication.

In a fourth communication 620 transmitted from the IM xAPP 604 to the non-RT RIC 602, the IM xAPP 604 sends a request for modeling information (e.g., a traffic prediction model message and/or mobility prediction model request message) to the non-RT RIC 602 for all or selected UEs in a given area (e.g., cell edge, from point A to point B). If the monitoring event is a UE monitoring event, this may apply to models for selected UEs.

In a fifth communication 622 transmitted from the non-RT RIC 602 to the IM xAPP 604, the IM xAPP 604 receives the modeling information (e.g., a traffic prediction model report and/or mobility prediction model report which includes a trained AI and/or ML model) from the non-RT RIC 602. In some embodiments the fifth communication 622 may be sent from the non-RT RIC 602 to the IM xAPP 604, and, in other embodiments, the modeling information may instead be stored in a near-RT RIC database and retrieved by the IM xAPP 604. The modeling information may include: expected RAN resource conditions (e.g., channel statistics distribution over an entire area with highs and lows) for a period of time (e.g., 10 ms to 1 sec, predefined, configured, preconfigured), based on a configuration and/or an accuracy of prediction; expected wireless BH resource conditions (e.g., channel statistics distribution for involved BH links) for the period of time, based on the configuration, and/or an accuracy of prediction; expected UE mobility parameters, expected UE positioning information, and/or expected UE trajectories (e.g., anonymized) for UEs in a geographic area and/or an accuracy of prediction; expected performance metrics for UEs in the geographic area and/or an accuracy of prediction; an expected distribution of any of the above over the period of time; a confidence level metric for any of the above for the period of time; and/or expected sequence of inter-cell handovers for UEs in the geographic area.

The IM xAPP 604 determines 624 a new IM policy for affected RAN nodes. This may be a predefined policies based on the thresholds from the first communication 612 and/or the predictive information from the fifth communication 622. The determination may take the predicted performance metrics into account (e.g., considering also a prediction accuracy), and may also check whether these metrics meet thresholds which were set from the first communication 612. The IM xAPP 604 may select the IM policy that will result in higher preference and/or priority for optimizing performance based on IM policy preferences from the first communication 612 (e.g., CoMP is higher priority the ICIC).

In a sixth communication 626 transmitted from the IM xAPP 604 to the conflict mitigation 606, the IM xAPP 604 sends an updated IM policy request message to the conflict mitigation 606. The updated IM policy request message may include: a cell ID; a network slice ID; CU IDs; DU IDs; a current policy ID; a new policy ID; an enforcement flag; a time validity; and/or an area of coverage.

In a seventh communication 628 transmitted from the conflict mitigation 606 to the IM xAPP 604, the IM xAPP 604 receives a response (e.g., ACK, NACK) from the conflict mitigation 606.

In an eighth communication 630 transmitted from the IM xAPP 604 to the NR 610, the IM xAPP 604, based on successful reception of an ACK, provides the new IM policy to affected RAN nodes with an updated IM policy message. The updated IM policy message includes: a cell ID; a network slice ID; CU IDs; DU IDs; a current policy ID; a new policy ID; an enforcement flag; a time validity; an area of coverage; and/or per IM policy parameters (e.g., OI, HII, RNTP, ABS pattern information, CoMP coordination areas, CoMP scheme, resource restrictions (e.g., in time, frequency, and/or spatial domains)).

Figure 7:
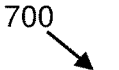
FIG. 7 is a diagram illustrating another embodiment of communications for interference management.

FIG. 7 is a diagram illustrating another embodiment of communications 700 for interference management. In this embodiment, an implementation targeting the O-RAN architecture is provided. In this architecture, an external application takes the form of an IM xAPP and middleware functionality is used. Use of the middleware functionality may reduce and/or relax the load on the IM xAPP which may be high (e.g., if the xAPP receives all radio related measurements and/or events and may be aware of low layer real-time configurations). As described herein, the middleware function may be deployed as a near-RT RIC function or as an agent co-located at the RAN side and may: receive UE and/or RAN monitoring reports and may translate them to actions and/or events that are perceivable by the IM xAPP (e.g., high load indication, RAN UE KPI reaching a low threshold)—this may be used for embodiments in which UE-related measurements may not be exposed to an xAPP, but just the abstracted event may be provided to the xAPP as an updated control message; and receive the requested updated IM policy and translate it to exact radio parameters to be used based on real-time radio conditions—this may enable the IM xAPP to be aware only of the high-level policy to be applied and not the radio parameters that need to be updated.

The communications 700 include communications between a non-RT RIC 702 (e.g., a service and/or management plane, received by a near-RT RIC at an A1 termination), an IM xAPP 704 (e.g., external application), a conflict mitigation 706 (e.g., conflict mitigation function, may be at a near-RT RIC), a subscription management 708 (e.g., subscription management function, may be at a near-RT RIC), a middleware 710 (e.g., middleware entity), and an NR 712 (e.g., E2T, E2 node, CU, DU, RAN nodes). The communications 700 described herein may each include one or more messages.

In a first communication 714 transmitted from the non-RT RIC 702 to the IM xAPP 704, the IM xAPP 704 may receive an interference management policy message (e.g., from a non-RT RIC via A1T and via an open API between A1T and the IM xAPP 604). The interface management policy message may include: a cell ID; a network slice ID; a service type, an application type and/or an application profile (e.g., these may be related to verticals); a policy ID list (e.g., a policy 1: ICIC scheme 1 (e.g., FFR); a policy 2: ICIC scheme 2 (e.g., SFR); a policy 3: eICIC scheme; a policy 4: CoMP scheme 1 (e.g., CS,CB); a policy 5: CoMP scheme 2 (e.g., coherent JT, coherent JR); a policy 6: CoMP scheme 2 (e.g., non-coherent JT, non-coherent JR)); thresholds per policy (e.g., an O-RAN cell computational load; an O-CU load; an O-DU load; a RAN allowable delay; backhaul requirements per policy; a UE density minimum and/or maximum; a radio resource load); an indication of what an interference management preference contains (e.g., a cell ID list; resource pool IDs; a preference of policy for a list of cells (e.g., shall, prefer, avoid, forbid); a priority of policy for the list of cells (e.g., shall, prefer, avoid, forbid)); an enforcement flag (e.g., to enforce a policy or not); a use of middleware flag (e.g., to use or not); a middleware ID; a middleware address; a time validity; an area of coverage; per vertical parameters (e.g., priorities among xAPPs within the same verticals, spectrum considerations, spectrum restrictions, isolation level, cluster of dedicated per vertical small cells under near-RT RIC); and/or cross-vertical parameters (e.g., priorities among xAPPs among verticals, spectrum considerations, spectrum restrictions, isolation level, cluster of common (for all verticals) small cells under near-RT RIC.

In a second communication 716 transmitted between the IM xAPP 704 and the subscription management 708, the IM xAPP 704 subscribes to the subscription management 708 of the near-RT RIC to receive RAN monitoring events, UE monitoring events, and/or measurements (e.g., RAN and/or UE) periodically. The subscription management 708 provides a request to RAN nodes respectively (e.g., this can be a merged request from more than one similar xAPP). This events monitored and/or measurements may include: radio resource utilization (e.g., DL and/or UL total PRB usage and/or distribution of usage, DL and/or UL PRB used for data traffic); DRB related measurements (e.g., number of DRBs successfully setup, in-session activity time for DRB);

CQI related measurements (e.g., wideband CQI distribution); MCS related Measurements; QoS retainability; KPI monitoring; RAN UE throughout KPI monitoring; average and distribution of delay DL and/or UL air-interface; NG-RAN handover success rate monitoring; number of requested handover resource allocations; number of successful handover resource allocations; and/or middleware ID and configuration of trigger events (e.g., which may be per vertical application or for all vertical applications).

In an optional third communication 718 transmitted between the subscription management 708 and the middleware 710, the subscription management 708 may provide a request to the middleware 710 for events and/or other information related to the subscription corresponding to the second communication 716.

In a fourth communication 720 transmitted from the NR 712 to the middleware 710, the middleware 710 receives monitoring reports from the NR 712. The monitoring reports may include: a cell ID; UE IDs; a network slice ID; a resource ID; a resource pool ID; a UE QoE downgrade indication; a QoS downgrade indication; a high resource load indication; a high RAN delay indication; a low backhaul resource availability indication; a QoS fluctuation indication; and/or a radio link failure indication.

The middleware 710 may transition 722 a monitoring report to a monitoring event based on subscription information and real-time analytics.

In a fifth communication 722 transmitted from the middleware 710 to the IM xAPP 704, the middleware 710, if a condition is met (e.g., based on thresholds from the first communication 714 and/or the monitoring subscription), transmits a monitoring event report message to the IM xAPP 704. This report message may include: a cell ID; UE IDs; a network slice ID; a resource ID; a resource pool ID; a UE QoE downgrade indication; a QoS downgrade indication; a high resource load indication; a high RAN delay indication; a low backhaul resource availability indication; a QoS fluctuation indication; a bandwidth adaptation requirement, a radio resource adaptation requirement, a traffic steering requirement, and/or a radio link failure indication.

In a sixth communication 726 transmitted from the IM xAPP 704 to the non-RT RIC 702, the IM xAPP 704 sends a request for modeling information (e.g., a traffic prediction model message and/or mobility prediction model request message) to the non-RT RIC 702 for all or selected UEs in a given area (e.g., cell edge, from point A to point B). If the monitoring event is a UE monitoring event, this may apply to models for selected UEs.

In a seventh communication 728 transmitted from the non-RT RIC 702 to the IM xAPP 704, the IM xAPP 704 receives the modeling information (e.g., a traffic prediction model report and/or mobility prediction model report which includes a trained AI and/or ML model) from the non-RT RIC 702. In some embodiments the seventh communication 728 may be sent from the non-RT RIC 702 to the IM xAPP 704, and, in other embodiments, the modeling information may instead be stored in a near-RT RIC database and retrieved by the IM xAPP 704. The modeling information may include: expected RAN resource conditions (e.g., channel statistics distribution over an entire area with highs and lows) for a period of time (e.g., 10 ms to 1 sec, predefined, configured, preconfigured), based on a configuration and/or an accuracy of prediction; expected wireless BH resource conditions (e.g., channel statistics distribution for involved BH links) for the period of time, based on the configuration, and/or an accuracy of prediction; expected UE mobility parameters, expected UE positioning information, and/or expected UE trajectories (e.g., anonymized) for UEs in a geographic area and/or an accuracy of prediction; expected performance metrics for UEs in the geographic area and/or an accuracy of prediction; an expected distribution of any of the above over the period of time; a confidence level metric for any of the above for the period of time; and/or expected sequence of inter-cell handovers for UEs in the geographic area.

The IM xAPP 704 determines 730 a new IM policy for affected RAN nodes. This may be a predefined policies based on the thresholds from the first communication 714 and/or the predictive information from the seventh communication 728. The determination may take the predicted performance metrics into account (e.g., considering also a prediction accuracy), and may also check whether these metrics meet thresholds which were set from the first communication 714. The IM xAPP 704 may select the IM policy that will result in higher preference and/or priority for optimizing performance based on IM policy preferences from the first communication 714 (e.g., CoMP is higher priority the ICIC).

In an eighth communication 732 transmitted from the IM xAPP 704 to the conflict mitigation 706, the IM xAPP 704 sends an updated IM policy request message to the conflict mitigation 706. The updated IM policy request message may include: a cell ID; a network slice ID; CU IDs; DU IDs; a current policy ID; a new policy ID; an enforcement flag; a time validity; and/or an area of coverage.

In a ninth communication 734 transmitted from the conflict mitigation 706 to the IM xAPP 704, the IM xAPP 704 receives a response (e.g., ACK, NACK) from the conflict mitigation 706.

In a tenth communication 736 transmitted from the IM xAPP 704 to the middleware 710, the IM xAPP 704, based on successful reception of an ACK, provides the new IM policy to the middleware 710 with an updated IM policy message. The updated IM policy message includes: a cell ID; a network slice ID; CU IDs; DU IDs; a current policy ID; a new policy ID; an enforcement flag; a time validity; an area of coverage; and/or per IM policy parameters (e.g., OI, HII, RNTP, ABS pattern information, CoMP coordination areas, CoMP scheme, resource restrictions (e.g., in time, frequency, and/or spatial domains)).

The middleware 710 checks 738 the real-time radio resource conditions for the involved RAN nodes, and derives policy parameters to be provided to the RAN nodes.

In an eleventh communication 740 transmitted from the middleware 710 to the NR 712, the middleware 710 sends an IM policy parameters to apply message to the NR 712. The IM policy parameters to apply message may include: a cell ID; UE IDs, a resource ID; a resource pool ID; and/or per IM policy parameters (e.g., OI, HII, RNTP, ABS pattern information, CoMP coordination areas, CoMP scheme, resource restrictions (e.g., in time, frequency, and/or spatial domains)).

FIG. 8 is a flow chart diagram illustrating one embodiment of a method 800 for model based predictive interference management. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 modeling information corresponding to a device, wherein the modeling information comprises traffic parameters, radio parameters, mobility parameters, or some combination thereof, and the modeling information comprises at least one machine learning model. In some embodiments, the method 800 includes determining 804 a predictive inter-cell interference management policy for the device based on the modeling information. In certain embodiments, the method 800 includes providing 806 the predictive inter-cell interference management policy to the device.

In certain embodiments, the method 800 further comprises receiving an initial configuration prior to determining the predictive inter-cell interference management policy. In some embodiments, the initial configuration is transmitted from a service entity, a management entity, or a combination thereof. In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer. In certain embodiments, the method 800 further comprises obtaining a monitoring event report related to the device. In some embodiments, the predictive inter-cell interference management policy is determined in response to obtaining the monitoring event report.

In various embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, or some combination thereof. In one embodiment, the method 800 further comprises subscribing to a radio access network node, a subscription function, or a combination thereof for receiving the monitoring event report. In certain embodiments, the device comprises at least one network unit, at least one user equipment, or a combination thereof.

In some embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof. In various embodiments, the predictive inter-cell interference management policy is provided to a middleware entity. In one embodiment, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof.

In certain embodiments, the method 800 further comprises requesting a validation of the predictive inter-cell interference management policy from a conflict mitigation function and receiving a validation response from the conflict mitigation function. In some embodiments, communications are transmitted and received using an open application program interface. In various embodiments, an A1 interface is used for communications with a service entity, a management entity, or a combination thereof.

In one embodiment, an E2 interface is used for communications with new radio devices. In certain embodiments, the predictive inter-cell interference management policy is provided to the device via an application exposure function.

Figure 9:
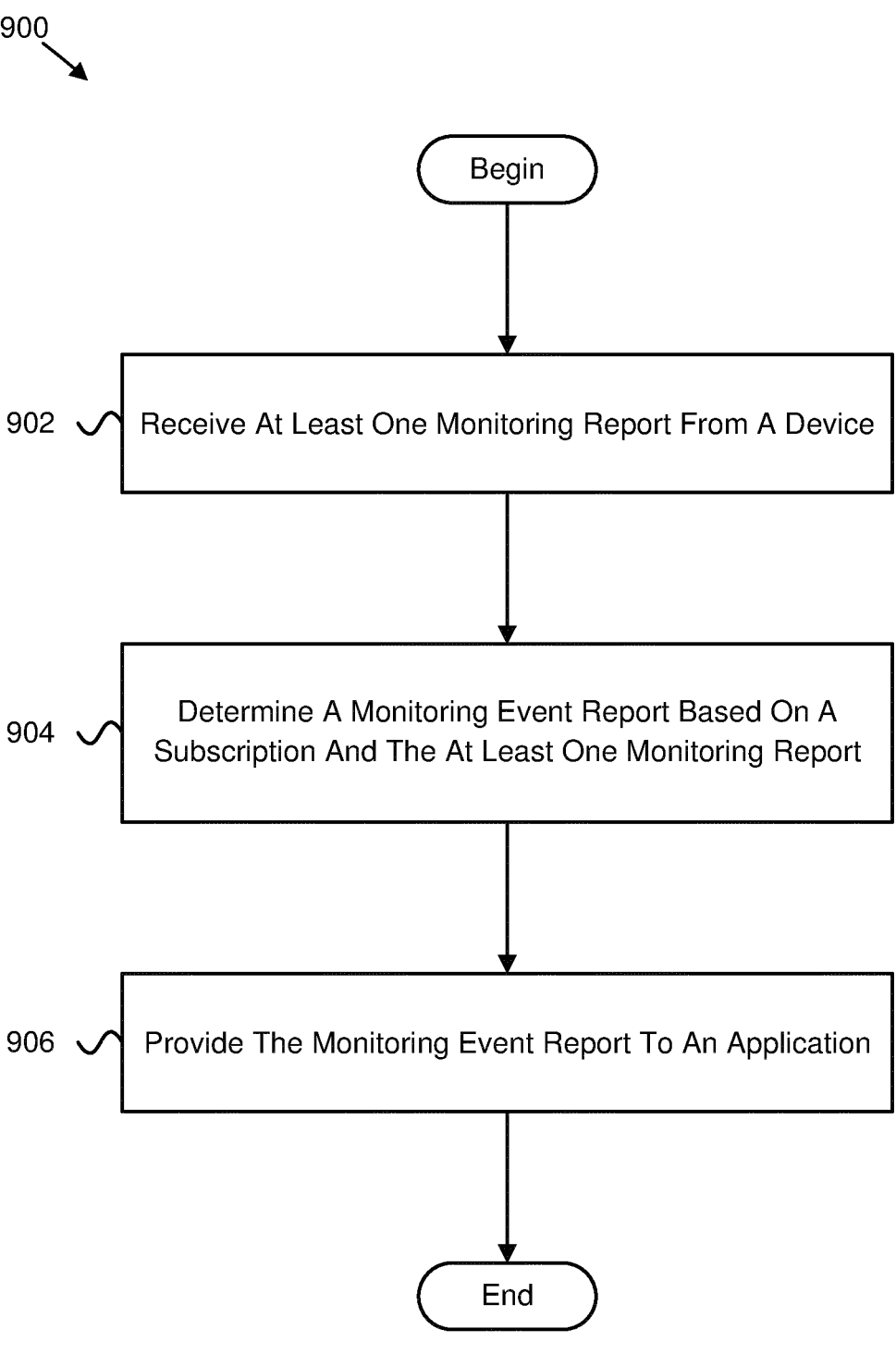
FIG. 9 is a flow chart diagram illustrating another embodiment of a method for model based predictive interference management.

FIG. 9 is a flow chart diagram illustrating another embodiment of a method 900 for model based predictive interference management. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 at least one monitoring report from a device. In some embodiments, the method 900 includes determining 904 a monitoring event report based on a subscription and the at least one monitoring report. In certain embodiments, the method 900 includes providing 906 the monitoring event report to an application.

In certain embodiments, the method 900 further comprises: receiving a predictive inter-cell interference management policy from the application; determining at least one radio parameter corresponding to the predictive inter-cell interference management policy; and transmitting the at least one radio parameter based on the predictive inter-cell interference management policy to the device. In some embodiments, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof. In various embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication), or some combination thereof.

In one embodiment, the predictive inter-cell interference management policy is provided to the device via an application exposure function. In certain embodiments, the method 900 further comprises receiving a subscription request for the subscription from the application. In some embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

Figure 10:
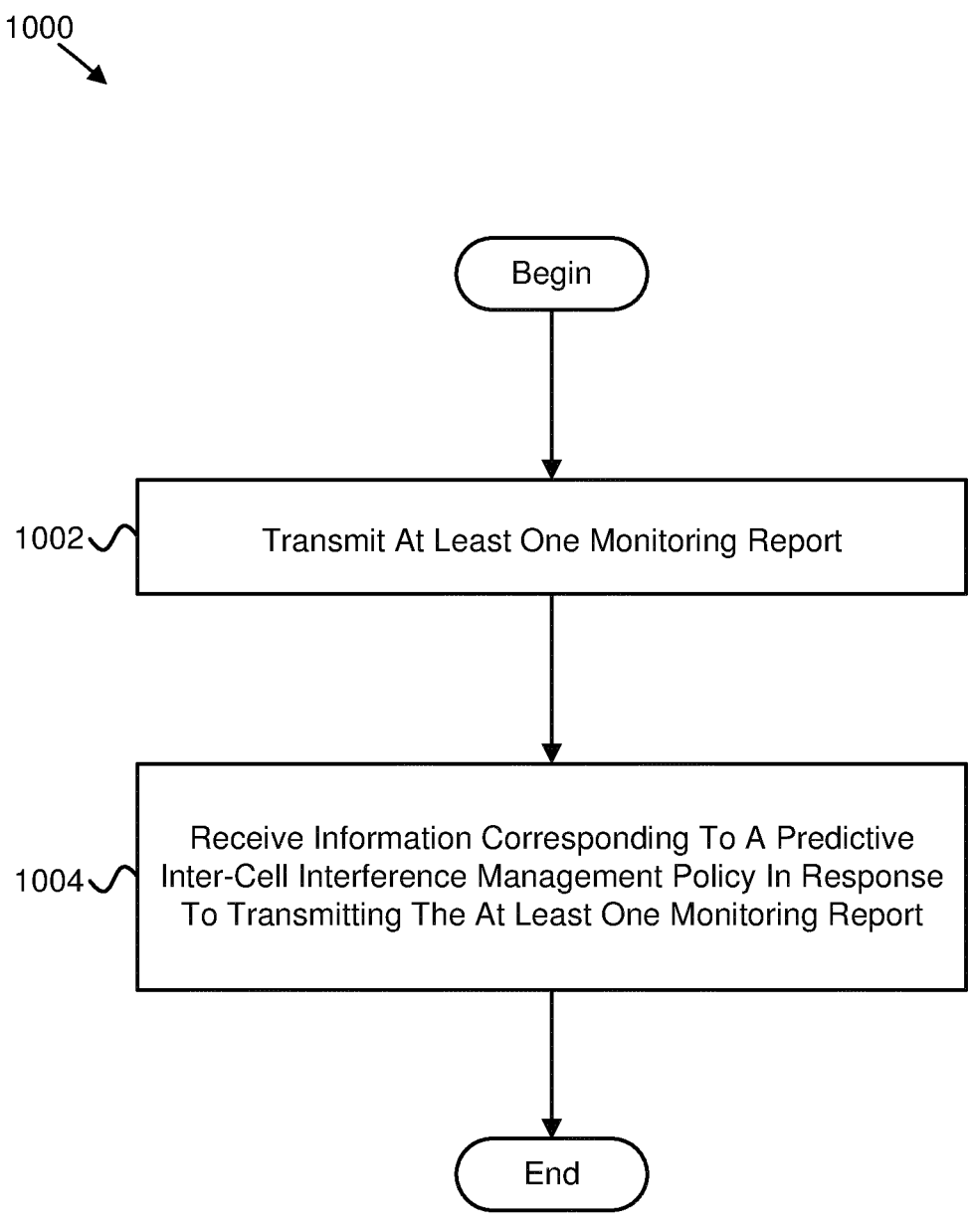
FIG. 10 is a flow chart diagram illustrating yet another embodiment of a method for model based predictive interference management.

FIG. 10 is a flow chart diagram illustrating yet another embodiment of a method 1000 for model based predictive interference management. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes transmitting 1002 at least one monitoring report. In some embodiments, the method 1000 includes receiving 1004 information corresponding to a predictive inter-cell interference management policy in response to transmitting the at least one monitoring report.

In certain embodiments, the at least one monitoring report comprises a monitoring event report comprising a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In some embodiments, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof. In various embodiments, the at least one monitoring report is transmitted to a middleware entity or an application. In one embodiment, the information corresponding to the predictive inter-cell interference management policy is received from a middleware entity or an application.

Figure 11:
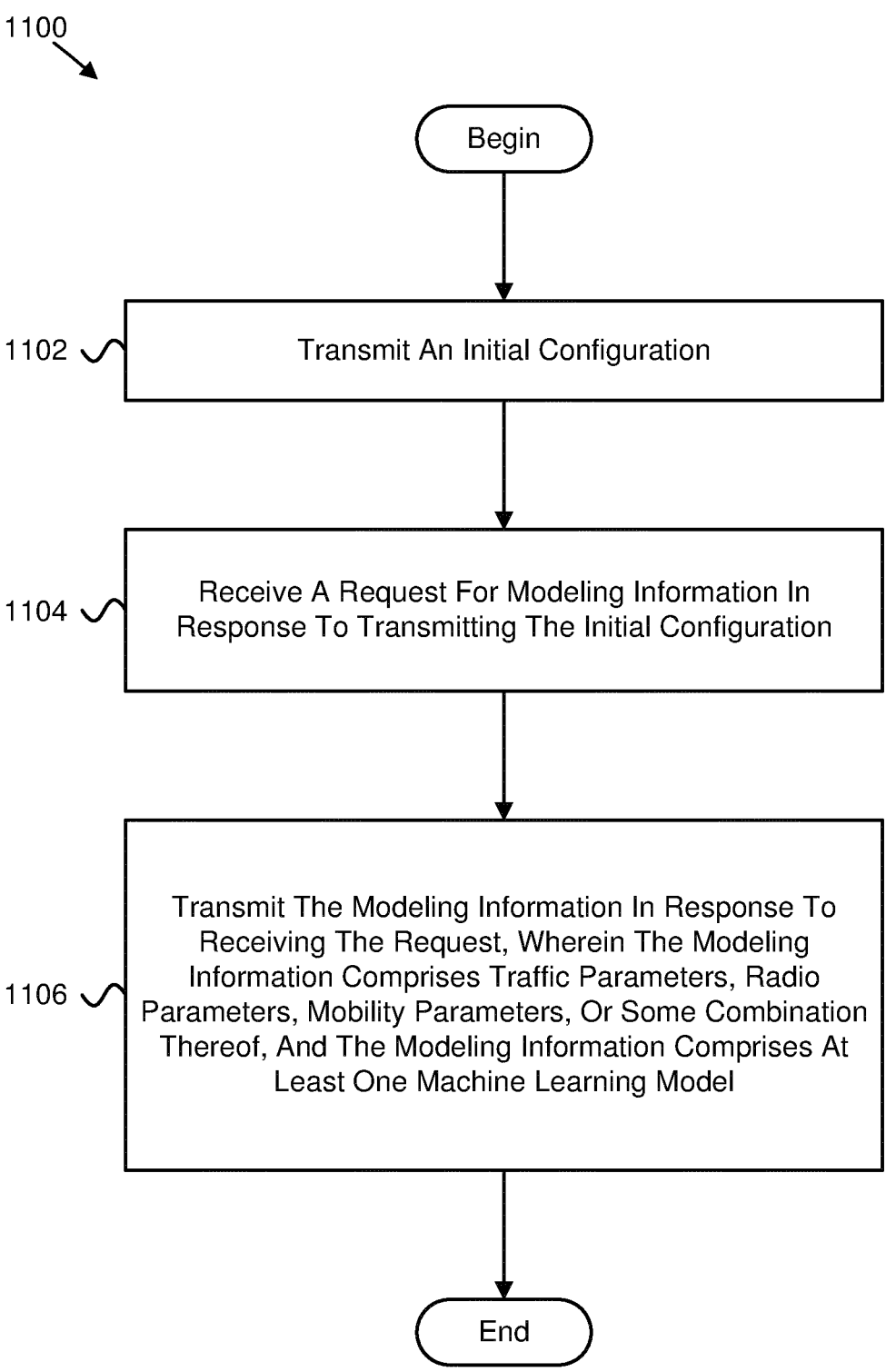
FIG. 11 is a flow chart diagram illustrating a further embodiment of a method for model based predictive interference management.

FIG. 11 is a flow chart diagram illustrating a further embodiment of a method 1100 for model based predictive interference management. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 an initial configuration. In some embodiments, the method 1100 includes receiving 1104 a request for modeling information in response to transmitting the initial configuration. In certain embodiments, the method 1100 includes transmitting 1106 the modeling information in response to receiving the request, wherein the modeling information comprises traffic parameters, radio parameters, mobility parameters, or some combination thereof, and the modeling information comprises at least one machine learning model.

In certain embodiments, the initial configuration is transmitted to an application. In some embodiments, the initial configuration is transmitted from a service entity, a management entity, or a combination thereof. In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer. In certain embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof.

Figure 12:
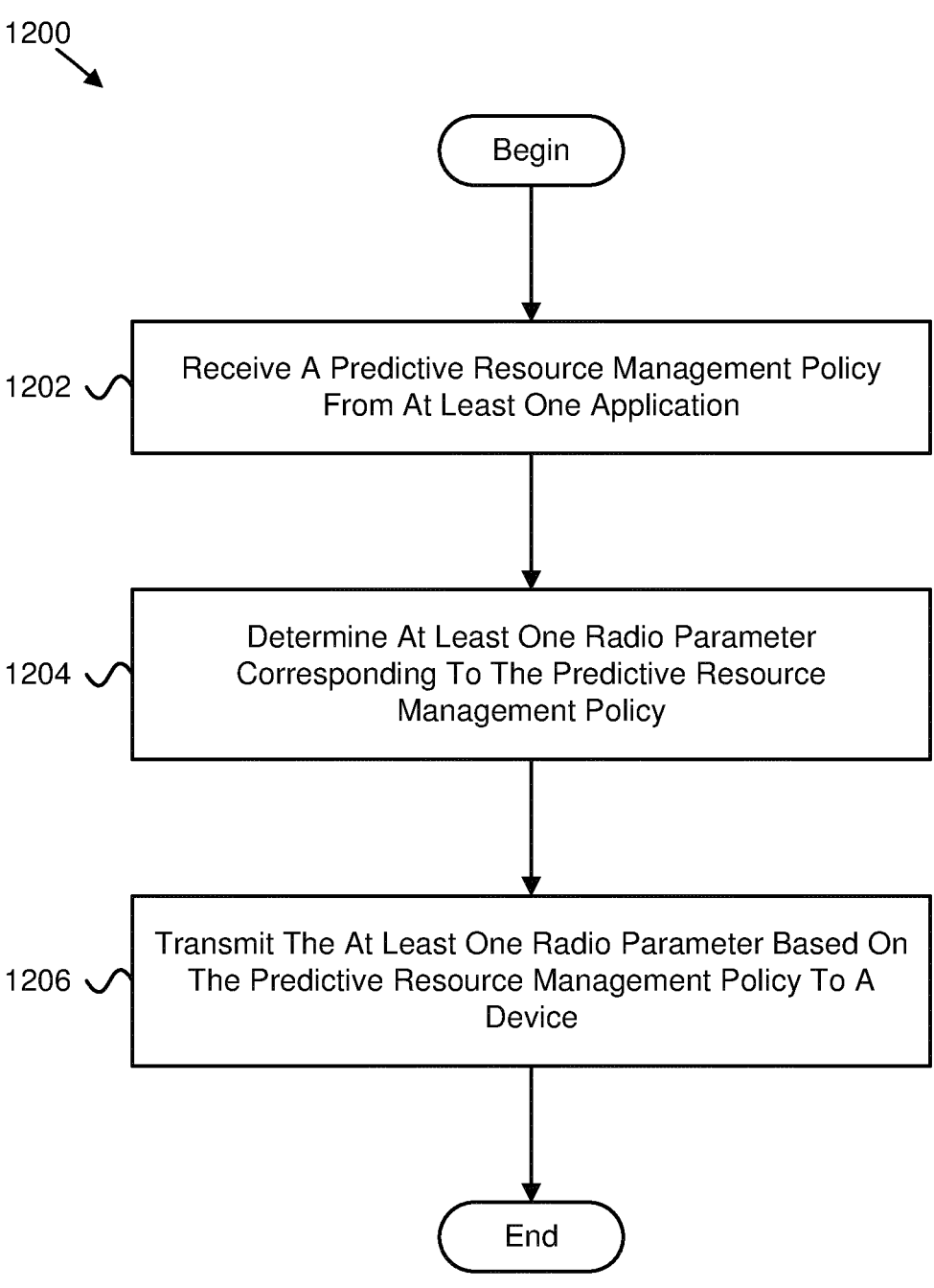
FIG. 12 is a flow chart diagram illustrating another embodiment of a method for model based predictive interference management.

FIG. 12 is a flow chart diagram illustrating another embodiment of a method 1200 for model based predictive interference management. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202 a predictive resource management policy from at least one application. In various embodiments, the method 1200 includes determining 1204 at least one radio parameter corresponding to the predictive resource management policy. In some embodiments, the method 1200 includes transmitting 1206 the at least one radio parameter based on the predictive resource management policy to a device.

In certain embodiments, the predictive resource management policy comprises an application identifier, a group of user equipments identifier, a cell identifier, a network slice identifier, a central unit identifier, a distributed unit identifier, a current inter-cell interference management policy identifier, a new inter-cell interference policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof. In some embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication) or some combination thereof.

In various embodiments, the predictive resource management policy is provided to the device via an application exposure function. In one embodiment, the device comprises at least one network unit, at least one user equipment, or a combination thereof. In certain embodiments, the at least one radio parameter is further determined based on at least one predefined rule corresponding to an application type, a service type, or a combination thereof.

In some embodiments, the predefined rule comprises a key performance indicator, a service type identifier, an application type identifier, a radio access network identifier, a network slice profile, a service profile, a quality of service target (a guaranteed flow bit rate, a maximum flow bit rate, a priority level, a packet delay budget parameter, a reliability parameter, packet error rate parameter), a quality of experience target (a quality of experience score, an initial buffering parameter, a stalling event, a stalling ratio, a mean opinion score), a priority identifier, an application quality of service-to-network quality of service mapping information, or some combination thereof.

In various embodiments, the method 1200 further comprises: receiving at least one monitoring report from a device; determining a monitoring event report based on a subscription and the at least one monitoring report; and transmitting the monitoring event report to an application. In one embodiment, the method 1200 further comprises receiving a subscription request for the subscription from the application.

In certain embodiments, the monitoring report comprises a user equipment quality of service parameter, a user equipment quality of experience parameter, a radio resource quality parameter, a computational radio access network resource load parameter, a central unit load, a distribute unit load, a channel state information, a radio resource management measurement, a radio link monitoring measurement, a received signal strength indicator, a reference signal received power parameter, a handover failure monitoring parameter, or some combination thereof.

In some embodiments, the monitoring report further comprising a backhaul radio resource quality parameter, a backhaul channel state information, a backhaul radio resource management measurement, a backhaul radio link monitoring measurement, a backhaul topology parameter, a backhaul type parameter, or some combination thereof. In various embodiments, the monitoring event report is determined based on offline user equipment analytics, online user equipment analytics, radio resource quality analytics, or some combination thereof.

In one embodiment, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In one embodiment, a method comprises: receiving modeling information corresponding to a device, wherein the modeling information comprises traffic parameters, radio parameters, mobility parameters, or some combination thereof, and the modeling information comprises at least one machine learning model; determining a predictive inter-cell interference management policy for the device based on the modeling information; and providing the predictive inter-cell interference management policy to the device.

In certain embodiments, the method further comprises receiving an initial configuration prior to determining the predictive inter-cell interference management policy.

In some embodiments, the initial configuration is transmitted from a service entity, a management entity, or a combination thereof.

In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer.

In certain embodiments, the method further comprises obtaining a monitoring event report related to the device.

In some embodiments, the predictive inter-cell interference management policy is determined in response to obtaining the monitoring event report.

In various embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, or some combination thereof.

In one embodiment, the method further comprises subscribing to a radio access network node, a subscription function, or a combination thereof for receiving the monitoring event report.

In certain embodiments, the device comprises at least one network unit, at least one user equipment, or a combination thereof.

In some embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof.

In various embodiments, the predictive inter-cell interference management policy is provided to a middleware entity.

In one embodiment, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof.

In certain embodiments, the method further comprises requesting a validation of the predictive inter-cell interference management policy from a conflict mitigation function and receiving a validation response from the conflict mitigation function.

In some embodiments, communications are transmitted and received using an open application program interface.

In various embodiments, an A1 interface is used for communications with a service entity, a management entity, or a combination thereof.

In one embodiment, an E2 interface is used for communications with new radio devices.

In certain embodiments, the predictive inter-cell interference management policy is provided to the device via an application exposure function.

In one embodiment, an apparatus comprises: a receiver that receives modeling information corresponding to a device, wherein the modeling information comprises traffic parameters, radio parameters, mobility parameters, or some combination thereof, and the modeling information comprises at least one machine learning model; and a processor that: determines a predictive inter-cell interference management policy for the device based on the modeling information; and provides the predictive inter-cell interference management policy to the device.

In certain embodiments, the receiver receives an initial configuration prior to determining the predictive inter-cell interference management policy.

In some embodiments, the initial configuration is transmitted from a service entity, a management entity, or a combination thereof.

In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer.

In certain embodiments, the receiver obtains a monitoring event report related to the device.

In some embodiments, the predictive inter-cell interference management policy is determined in response to obtaining the monitoring event report.

In various embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, or some combination thereof.

In one embodiment, the processor subscribes to a radio access network node, a subscription function, or a combination thereof for receiving the monitoring event report.

In certain embodiments, the device comprises at least one network unit, at least one user equipment, or a combination thereof.

In some embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof.

In various embodiments, the predictive inter-cell interference management policy is provided to a middleware entity.

In one embodiment, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof.

In certain embodiments, the receiver requests a validation of the predictive inter-cell interference management policy from a conflict mitigation function and receives a validation response from the conflict mitigation function.

In some embodiments, communications are transmitted and received using an open application program interface.

In various embodiments, an A1 interface is used for communications with a service entity, a management entity, or a combination thereof.

In one embodiment, an E2 interface is used for communications with new radio devices.

In certain embodiments, the predictive inter-cell interference management policy is provided to the device via an application exposure function.

In one embodiment, a method comprises: receiving at least one monitoring report from a device; determining a monitoring event report based on a subscription and the at least one monitoring report; and providing the monitoring event report to an application.

In certain embodiments, the method further comprises: receiving a predictive inter-cell interference management policy from the application; determining at least one radio parameter corresponding to the predictive inter-cell interference management policy; and transmitting the at least one radio parameter based on the predictive inter-cell interference management policy to the device.

In some embodiments, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof.

In various embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication), or some combination thereof.

In one embodiment, the predictive inter-cell interference management policy is provided to the device via an application exposure function.

In certain embodiments, the method further comprises receiving a subscription request for the subscription from the application.

In some embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, or some combination thereof.

In one embodiment, an apparatus comprises: a receiver that receives at least one monitoring report from a device; and a processor that: determines a monitoring event report based on a subscription and the at least one monitoring report; and provides the monitoring event report to an application.

In certain embodiments, the apparatus further comprises a transmitter, wherein: the receiver receives a predictive inter-cell interference management policy from the application; the processor determines at least one radio parameter corresponding to the predictive inter-cell interference management policy; and the transmitter transmits the at least one radio parameter based on the predictive inter-cell interference management policy to the device.

In some embodiments, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof.

In various embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication), or some combination thereof.

In one embodiment, the predictive inter-cell interference management policy is provided to the device via an application exposure function.

In certain embodiments, the receiver receives a subscription request for the subscription from the application.

In some embodiments, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In one embodiment, a method comprises: transmitting at least one monitoring report; and receiving information corresponding to a predictive inter-cell interference management policy in response to transmitting the at least one monitoring report.

In certain embodiments, the at least one monitoring report comprises a monitoring event report comprising a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In some embodiments, the predictive inter-cell interference management policy comprises a cell identifier, an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof.

In various embodiments, the at least one monitoring report is transmitted to a middleware entity or an application.

In one embodiment, the information corresponding to the predictive inter-cell interference management policy is received from a middleware entity or an application.

In one embodiment, an apparatus comprises: a transmitter that transmits at least one monitoring report; and a receiver that receives information corresponding to a predictive inter-cell interference management policy in response to transmitting the at least one monitoring report.

In certain embodiments, the at least one monitoring report comprises a monitoring event report comprising a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In some embodiments, the predictive inter-cell interference management policy comprises a cell identifier an application identifier, a group of user equipments identifier, a network slice identifier, a central unit identifier, a distributed unit identifier, a current policy identifier, a new policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, an overload indication, a high interference indication, a relative narrowband transmit power, almost blank subframe pattern information, a coordinated multipoint coordination area, a coordinated multipoint scheme, a resource restriction, or some combination thereof.

In various embodiments, the at least one monitoring report is transmitted to a middleware entity or an application.

In one embodiment, the information corresponding to the predictive inter-cell interference management policy is received from a middleware entity or an application.

In one embodiment, a method comprises: transmitting an initial configuration; receiving a request for modeling information in response to transmitting the initial configuration; and transmitting the modeling information in response to receiving the request, wherein the modeling information comprises traffic parameters, radio parameters, mobility parameters, or some combination thereof, and the modeling information comprises at least one machine learning model.

In certain embodiments, the initial configuration is transmitted to an application.

In some embodiments, the initial configuration is transmitted from a service entity, a management entity, or a combination thereof.

In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer.

In certain embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof.

In one embodiment, an apparatus comprises: a transmitter that transmits an initial configuration; a receiver that receives a request for modeling information in response to transmitting the initial configuration; wherein the transmitter transmits the modeling information in response to receiving the request, wherein the modeling information comprises traffic parameters, radio parameters, mobility parameters, or some combination thereof, and the modeling information comprises at least one machine learning model.

In certain embodiments, the initial configuration is transmitted to an application.

In some embodiments, the initial configuration is transmitted from a service entity, a management entity, or a combination thereof.

In various embodiments, the initial configuration comprises a cell identifier, a network slice identifier, a service type, an application type, a profile, a policy identifier list, per policy metrics, per policy thresholds, an interference management preference, an enforcement flag, a middleware flag, a middleware identifier, a time validity indicator, a geographic area, vertical specific parameters, cross-vertical parameters, or some combination thereof.

In one embodiment, the initial configuration is configured per vertical customer.

In certain embodiments, the modeling information comprises: a first expectation of radio access network resource conditions for a predefined period of time; a second expectation of wireless backhaul resource conditions for the predefined period of time; a third expectation of user equipment mobility parameters, an expectation of user equipment positioning information, or a combination thereof for user equipments in a geographic area; a fourth expectation of performance metrics for the user equipments in the geographic area; an expected distribution of the first expectation, the second expectation, the third expectation, the fourth expectation, or some combination thereof over the predefined period of time; a confidence level metric for the first expectation, the second expectation, the third expectation, the fourth expectation, or some combination thereof over the predefined period of time; an expected probability density function over radio access network resources, backhaul resources, or a combination thereof; an expectation of a sequence of inter-cell handovers for the user equipments in the geographic area; or some combination thereof.

In one embodiment, a method comprises: receiving a predictive resource management policy from at least one application; determining at least one radio parameter corresponding to the predictive resource management policy; and transmitting the at least one radio parameter based on the predictive resource management policy to a device.

In certain embodiments, the predictive resource management policy comprises an application identifier, a group of user equipments identifier, a cell identifier, a network slice identifier, a central unit identifier, a distributed unit identifier, a current inter-cell interference management policy identifier, a new inter-cell interference policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof.

In some embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication), or some combination thereof.

In various embodiments, the predictive resource management policy is provided to the device via an application exposure function.

In one embodiment, the device comprises at least one network unit, at least one user equipment, or a combination thereof.

In certain embodiments, the at least one radio parameter is further determined based on at least one predefined rule corresponding to an application type, a service type, or a combination thereof.

In some embodiments, the predefined rule comprises a key performance indicator, a service type identifier, an application type identifier, a radio access network identifier, a network slice profile, a service profile, a quality of service target (a guaranteed flow bit rate, a maximum flow bit rate, a priority level, a packet delay budget parameter, a reliability parameter, packet error rate parameter), a quality of experience target (a quality of experience score, an initial buffering parameter, a stalling event, a stalling ratio, a mean opinion score), a priority identifier, an application quality of service-to-network quality of service mapping information, or some combination thereof.

In various embodiments, the method further comprises: receiving at least one monitoring report from a device; determining a monitoring event report based on a subscription and the at least one monitoring report; and transmitting the monitoring event report to an application.

In one embodiment, the method further comprises receiving a subscription request for the subscription from the application.

In certain embodiments, the monitoring report comprises a user equipment quality of service parameter, a user equipment quality of experience parameter, a radio resource quality parameter, a computational radio access network resource load parameter, a central unit load, a distribute unit load, a channel state information, a radio resource management measurement, a radio link monitoring measurement, a received signal strength indicator, a reference signal received power parameter, a handover failure monitoring parameter, or some combination thereof.

In some embodiments, the monitoring report further comprising a backhaul radio resource quality parameter, a backhaul channel state information, a backhaul radio resource management measurement, a backhaul radio link monitoring measurement, a backhaul topology parameter, a backhaul type parameter, or some combination thereof.

In various embodiments, the monitoring event report is determined based on offline user equipment analytics, online user equipment analytics, radio resource quality analytics, or some combination thereof.

In one embodiment, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

In one embodiment, an apparatus comprises: a receiver that receives a predictive resource management policy from at least one application; a processor that determines at least one radio parameter corresponding to the predictive resource management policy; and a transmitter that transmits the at least one radio parameter based on the predictive resource management policy to a device.

In certain embodiments, the predictive resource management policy comprises an application identifier, a group of user equipments identifier, a cell identifier, a network slice identifier, a central unit identifier, a distributed unit identifier, a current inter-cell interference management policy identifier, a new inter-cell interference policy identifier, a current traffic steering policy identifier (this identifier may map to one of the following policies for one or more user equipments: 1) intra-frequency gNB selection 2) inter-frequency gNB selection 3) central unit selection, 4) distributed unit selection, 5) dual connectivity operation selection), a new traffic steering policy identifier (this may be an updated traffic steering policy based on the predictive inter-cell interference management policy), a confidence level parameter, an enforcement flag, a time validity indicator, an area indicator, or some combination thereof.

In some embodiments, the at least one radio parameter comprises an overload indication, a high interference indication, a relative narrowband transmit power, almost blank subframe pattern information, a coordinated multipoint coordination area, a coordinated multipoint scheme, a resource restriction, parameters for the traffic steering policy update (a handover request indication, a source cell identifier, a target cell identifier, a frequency selection indication, a radio access technology selection indication, a radio interface selection indication, a distributed unit selection indication, a central unit selection indication), or some combination thereof.

In various embodiments, the predictive resource management policy is provided to the device via an application exposure function.

In one embodiment, the device comprises at least one network unit, at least one user equipment, or a combination thereof.

In certain embodiments, the at least one radio parameter is further determined based on at least one predefined rule corresponding to an application type, a service type, or a combination thereof.

In some embodiments, the predefined rule comprises a key performance indicator, a service type identifier, an application type identifier, a radio access network identifier, a network slice profile, a service profile, a quality of service target (a guaranteed flow bit rate, a maximum flow bit rate, a priority level, a packet delay budget parameter, a reliability parameter, packet error rate parameter), a quality of experience target (a quality of experience score, an initial buffering parameter, a stalling event, a stalling ratio, a mean opinion score), a priority identifier, an application quality of service-to-network quality of service mapping information, or some combination thereof.

In various embodiments: the receiver receives at least one monitoring report from a device; the processor determines a monitoring event report based on a subscription and the at least one monitoring report; and the transmitter transmits the monitoring event report to an application.

In one embodiment, the receiver receives a subscription request for the subscription from the application.

In certain embodiments, the monitoring report comprises a user equipment quality of service parameter, a user equipment quality of experience parameter, a radio resource quality parameter, a computational radio access network resource load parameter, a central unit load, a distribute unit load, a channel state information, a radio resource management measurement, a radio link monitoring measurement, a received signal strength indicator, a reference signal received power parameter, a handover failure monitoring parameter, or some combination thereof.

In some embodiments, the monitoring report further comprising a backhaul radio resource quality parameter, a backhaul channel state information, a backhaul radio resource management measurement, a backhaul radio link monitoring measurement, a backhaul topology parameter, a backhaul type parameter, or some combination thereof.

In various embodiments, the monitoring event report is determined based on offline user equipment analytics, online user equipment analytics, radio resource quality analytics, or some combination thereof.

In one embodiment, the monitoring event report comprises a cell identifier, a user equipment identifier, a network slice identifier, a resource identifier, a resource pool identifier, a user equipment quality of experience downgrade indication, a user equipment quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, a traffic steering requirement, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network function, the method comprising:

receiving, from a radio access network (RAN) intelligent controller (RIC), at least one monitoring report from a device, wherein the at least one monitoring report comprises one or more of radio resource utilization information, quality-of-service (QoS) information, or backhaul information;

determining a monitoring event report indicating that a performance metric for a user equipment (UE) or the device has changed, wherein the monitoring event report is determined based on a subscription and the at least one monitoring report; and providing the monitoring event report to an application.

2. The method of claim 1, further comprising:

receiving a predictive inter-cell interference management policy from the application;

determining at least one radio parameter corresponding to the predictive inter-cell interference management policy; and transmitting the at least one radio parameter based on the predictive inter-cell interference management policy to the device.

3. The method of claim 2, wherein the predictive inter-cell interference management policy comprises one or more of a cell identifier (ID), an application ID, a group of UE IDs, a network slice ID, a central unit (CU) ID, a distributed unit (DU) ID, a current policy ID, a new policy ID, a current traffic steering policy ID, a new traffic steering policy ID, a confidence level parameter, an enforcement flag, a time validity indicator, or an area indicator.

4. The method of claim 2, wherein the at least one radio parameter comprises one or more of an overload indication, a high interference indication, a relative narrowband transmit power, almost blank subframe pattern information, a coordinated multipoint coordination area, a coordinated multipoint scheme, a resource restriction, a handover request indication, a source cell ID, a target cell ID, a frequency selection indication, a radio access technology selection indication, a radio interface selection indication, a distributed unit selection indication, or a central unit (CU) selection indication.

5. The method of claim 2, wherein the predictive inter-cell interference management policy is provided to the device via an application exposure function.

6. The method of claim 1, further comprising receiving a subscription request for the subscription from the application.

7. The method of claim 1, wherein the monitoring event report comprises one or more of a cell identifier (ID), a UE ID, a network slice ID, a resource ID, a resource pool ID, a UE quality of experience downgrade indication, a UE quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, or a traffic steering requirement.

8. An apparatus for performing a network function, the apparatus comprising:

at least one memory; and at least one processor coupled with the at least one memory and configured to cause the apparatus to:

receive, from a radio access network (RAN) intelligent controller (RIC), at least one monitoring report from a device, wherein the at least one monitoring report comprises one or more of radio resource utilization information, quality-of-service (QoS) information, or backhaul information;

determines a monitoring event report indicating that a performance metric for a user equipment (UE) or the device has changed, wherein the monitoring event report is determined based on a subscription and the at least one monitoring report; and provides the monitoring event report to an application.

9. A method performed by a network function, the method comprising:

receiving a predictive inter-cell interference management policy from at least one application, wherein the predictive inter-cell interference management policy comprises interference mitigation parameters comprising an enforcement flag, a time validity window, and priority information and associated enforcement conditions;

determining, based on the predictive inter-cell interference management policy and a radio resource condition, at least one radio parameter for configuring a radio access network (RAN) node, wherein determining comprises selecting resource allocation parameters from a set of pre-defined interference management schemes; and transmitting the at least one radio parameter to a middleware function or to the RAN node, wherein the at least one radio parameter is used to configure the RAN node for interference mitigation over a time interval.

10. The method of claim 9, wherein the predictive inter-cell interference management policy comprises one or more of a cell identifier (ID), an application ID, a group of UE IDs, a network slice ID, a central unit (CU) ID, a distributed unit (DU) ID, a current policy ID, a new policy ID, a current traffic steering policy ID, a new traffic steering policy ID, a confidence level parameter, an enforcement flag, a time validity indicator, or an area indicator.

11. The method of claim 9, wherein the at least one radio parameter comprises one or more of an overload indication, a high interference indication, a relative narrowband transmit power, almost blank subframe pattern information, a coordinated multipoint coordination area, a coordinated multipoint scheme, a resource restriction, a handover request indication, a source cell ID, a target cell ID, a frequency selection indication, a radio access technology selection indication, a radio interface selection indication, a distributed unit selection indication, or a central unit (CU) selection indication.

12. The method of claim 9, wherein the RAN node comprises at least one network unit, or at least one UE, or both.

13. The method of claim 9, wherein the at least one radio parameter is further determined based on at least one predefined rule corresponding to an application type, or a service type, or both.

14. The method of claim 13, wherein the predefined rule comprises one or more of a key performance indicator, a service type ID, an application type ID, a RAN ID, a network slice profile, a service profile, a quality of service target, a quality of experience target, a priority ID, or an application quality of service-to-network quality of service mapping information.

15. The method of claim 9, further comprising:

receiving at least one monitoring report from the RAN node;

determining a monitoring event report based on a subscription and the at least one monitoring report; and transmitting the monitoring event report to an application.

16. The method of claim 15, further comprising receiving a subscription request for the subscription from the application.

17. The method of claim 15, wherein the monitoring report comprises one or more of a UE quality of service (QoS) parameter, a UE quality of experience (QoE) parameter, a radio resource quality parameter, a computational RAN resource load parameter, a central unit (CU) load, a distribute unit (DU) load, a channel state information (CSI), a radio resource management measurement, a radio link monitoring measurement, a received signal strength indicator (RSSI), a reference signal received power (RSRP) parameter, or a handover failure monitoring parameter.

18. The method of claim 17, wherein the monitoring report further comprising one or more of a backhaul radio resource quality parameter, a backhaul CSI, a backhaul radio resource management measurement, a backhaul radio link monitoring measurement, a backhaul topology parameter, or a backhaul type parameter.

19. The method of claim 15, wherein the monitoring event report is determined based on one or more of offline UE analytics, online UE analytics, or radio resource quality analytics.

20. The method of claim 15, wherein the monitoring event report comprises one or more of a cell identifier (ID), a UE ID, a network slice ID, a resource ID, a resource pool ID, a UE quality of experience downgrade indication, a UE quality of service downgrade indication, a high resource load indication, a high radio access network delay indication, a low backhaul resource availability indication, a quality of service fluctuation indication, a radio link failure indication, a bandwidth adaptation requirement, a radio resource adaptation requirement, or a traffic steering requirement.

\* \* \* \* \*